UNITED STATES PATENT OFFICE.

LEON S. FINCH, OF DOVER, NEW JERSEY, ASSIGNOR TO HERCULES POWDER COMPANY, OF WILMINGTON, DELAWARE, A CORPORATION OF DELAWARE.

PROCESS OF CONCENTRATING ACETIC ANHYDRID.

1,311,158.     Specification of Letters Patent.     Patented July 29, 1919.

No Drawing.     Application filed March 7, 1919. Serial No. 281,220.

*To all whom it may concern:*

Be it known that I, LEON S. FINCH, a citizen of the United States, residing at Dover, county of Morris, and State of New Jersey, have invented a new and useful Improvement in Processes of Concentrating Acetic Anhydrid, of which the following is a full, clear, and exact description.

For certain purposes, the value of acetic anhydrid depends upon its freedom from acetic acid; in other words, upon its percentage of anhydrid. Inasmuch as manufacturers practising certain chemical processes accumulate large supplies of low grade acetic anhydrid, it is important to be able to separate from the same relatively strong acetic anhydrid. It is important, also, from an economical standpoint, to be able to carry out the process of concentration without the necessity of devising expensive special apparatus. I have discovered a process whereby this concentration may be effected without the use of any special apparatus or any apparatus that is not readily available, and in a highly economical manner.

The process consists in mixing the acetic anhydrid to be concentrated with sodium acetate and distilling off most of the acetic anhydrid. It also comprises subsequently distilling off most of the acetic acid. In order that the process may be readily practised by those skilled in the art, I deem it advisable to give a detailed description of exactly how I proceeded to execute the process in one of a number of instances in which it has been actually practised by me on a commercial scale.

I employed an ordinary steam-jacketed, mechanically-agitated still into which I introduced 1200 pounds of acetic anhydrid having 69.3 per cent. of anhydrid and 600 pounds of sodium acetate, of about 67 per cent. purity, rendered anhydrous by fusion and finely ground. The sodium acetate was first introduced and then the dilute acetic anhydrid was blown or sucked into the still gradually and uniformly and at such a rate as to require from thirty minutes to two hours for its introduction. The mass was continually agitated and heated partly by chemical reaction and partly by introduction of steam into the jacket of the still. (Hot water may also be used.) The distillation was carried out under a partial vacuum and the distillate was caught in a suitable receiver. While the temperature of distillation was not accurately determined, care was taken to keep the temperature down as close as reasonably possible to the minimum temperature required to drive off the acetic anhydrid. To regulate this, the distillate was tested every few minutes by means of the known solubility test in water (pure acetic anhydrid being almost insoluble in cold water) and the temperature of distillation was carefully controlled accordingly, being raised if the distillation was proceeding too slowly and lowered if the test disclosed a higher acetic acid content than was desired. The operation was continued until it became no longer possible to distil off strong anhydrid.

At the conclusion of the above operation, the anhydrid so distilled off weighed 874 pounds and contained 90.6 per cent. acetic anhydrid. I then proceeded to raise the temperature and distil off a second fraction. This weighed 248 pounds and contained only about 6.1 per cent. anhydrid, being, therefore, mainly acetic acid. The residue of about 600 pounds consisted, of course, mainly of sodium acetate, but contained about 5 per cent. acetic acid probably held as acetic acid of crystallization. The recovery efficiency was calculated at 97.6 per cent.

The above was approximately an average "run", and attained neither the maximum degree of concentration nor the maximum recovery efficiency disclosed in other runs. With care and experience, more nearly ideal results are secured, but no difficulty will be experienced, if the directions herein contained are followed, in securing, in an economical manner, a substantial concentration.

The amount of acetic acid which is present in the material after the strong acetic anhydrid is distilled off depends: first, upon the temperature of the still pot; second, upon the amount of vacuum used during distillation; third, upon the thoroughness of the agitation; and fourth, upon the time allowed for the distillation. Any acetic acid which is left in the residue may be neutralized by sodium carbonate, and the resultant material may then be re-fused and again utilized. This, however, adds to the expense of the process and consumes time. I consider that a valuable feature of my complete process consists in following the distillation of the strong anhydrid by distilling off, at a higher temperature, practically all of the acetic acid, thus making it possible to re-use the charge of sodium acetate without retreatment. In fact, it is possible to use one charge of sodium acetate for the concentration of an almost indefinite number of batches of weak acetic anhydrid.

While I have described the use of about two parts of relatively weak acetic anhydrid to about one part of sodium acetate, these proportions need not be rigidly adhered to. In any event, the proportion of sodium acetate depends, in large measure, both upon the strength of the anhydrid to be concentrated and the amount of concentration desired, and depends somewhat, also, upon the nature of the heating used for distilling off both acetic anhydrid and acetic acid. It is impracticable, therefore, to give precise directions, applicable to all cases, with respect to the proportion of sodium acetate that is most desirable to use. In concentrating much weaker acetic anhydrid than that which I started with in the example hereinbefore given, I used a substantially larger proportion of sodium acetate and while I secured a somewhat greater amount of concentration, I did not reach, and did not, indeed, aim to reach the degree of concentration attained in the example above given. It will be understood that, for some purposes, very strong acetic anhydrid is not desired. The skilled chemist will experience no serious difficulty in calculating the proportion of sodium acetate that it will be desirable to use to satisfy the requirements of the particular cases.

It may, in some instances, be desirable, especially in the concentration of weaker anhydrid, to separate more than one fraction of anhydrid before driving off the acetic acid, but in general I prefer, even with weaker anhydrid, to drive off nearly all of the anhydrid in one fraction.

In general it may be stated that the temperature required to distil off the anhydrid under a partial vacuum will vary from 70° to 100° C., while the temperature required to drive off the second fraction will vary from 90° to 170° C. It is a safer procedure, however, not to aim at any special temperature, but to very frequently test the anhydrid distilled off during the process and govern the application of heat accordingly, as hereinbefore described.

A feature of the process of some value is that the concentrated acetic anhydrid will be purified by entirely freeing it from chlorids.

Having now fully described my invention, what I claim and desire to protect by Letters Patent is:

1. The process of concentrating acetic anhydrid which comprises mixing the same with sodium acetate and distilling off acetic anhydrid.

2. The process of concentrating acetic anhydrid which comprises mixing the same with sodium acetate and distilling off acetic anhydrid and subsequently all or part of the acetic acid.

3. The process of concentrating acetic anhydrid which comprises mixing the same with sodium acetate, driving off the anhydrid by heat, elevating the temperature and driving off the larger part of the acetic acid, and re-using the residual sodium acetate to concentrate further quantities of acetic anhydrid.

4. The process of concentrating acetic anhydrid which comprises mixing the same with sodium acetate, distilling off acetic anhydrid under a partial vacuum and continuously agitating the mass during distillation.

5. The process of concentrating acetic anhydrid which comprises mixing the same with sodium acetate, heating the mass under a partial vacuum to the distillation temperature at the partial vacuum used, and then, after most of the anhydrid has been distilled off, supplying more heat to the mass to decompose the compound that has been formed between the sodium acetate and acetic acid and cause the sodium acetate to give up its acetic acid of crystallization.

6. The process of concentrating acetic anhydrid which comprises mixing the same with sodium acetate, driving off the anhydrid by heat, elevating the temperature and driving off the larger part of the acetic acid, re-using the residual sodium acetate to concentrate further quantities of acetic anhydrid, and, when the sodium acetate becomes inefficient for further use, neutralizing, fusing and re-grinding it to adapt it for re-use.

In testimony of which invention, I have hereunto set my hand, at Kenvil, N. J. on this 5th day of March, 1919.

LEON S. FINCH.